3,106,103
WORM

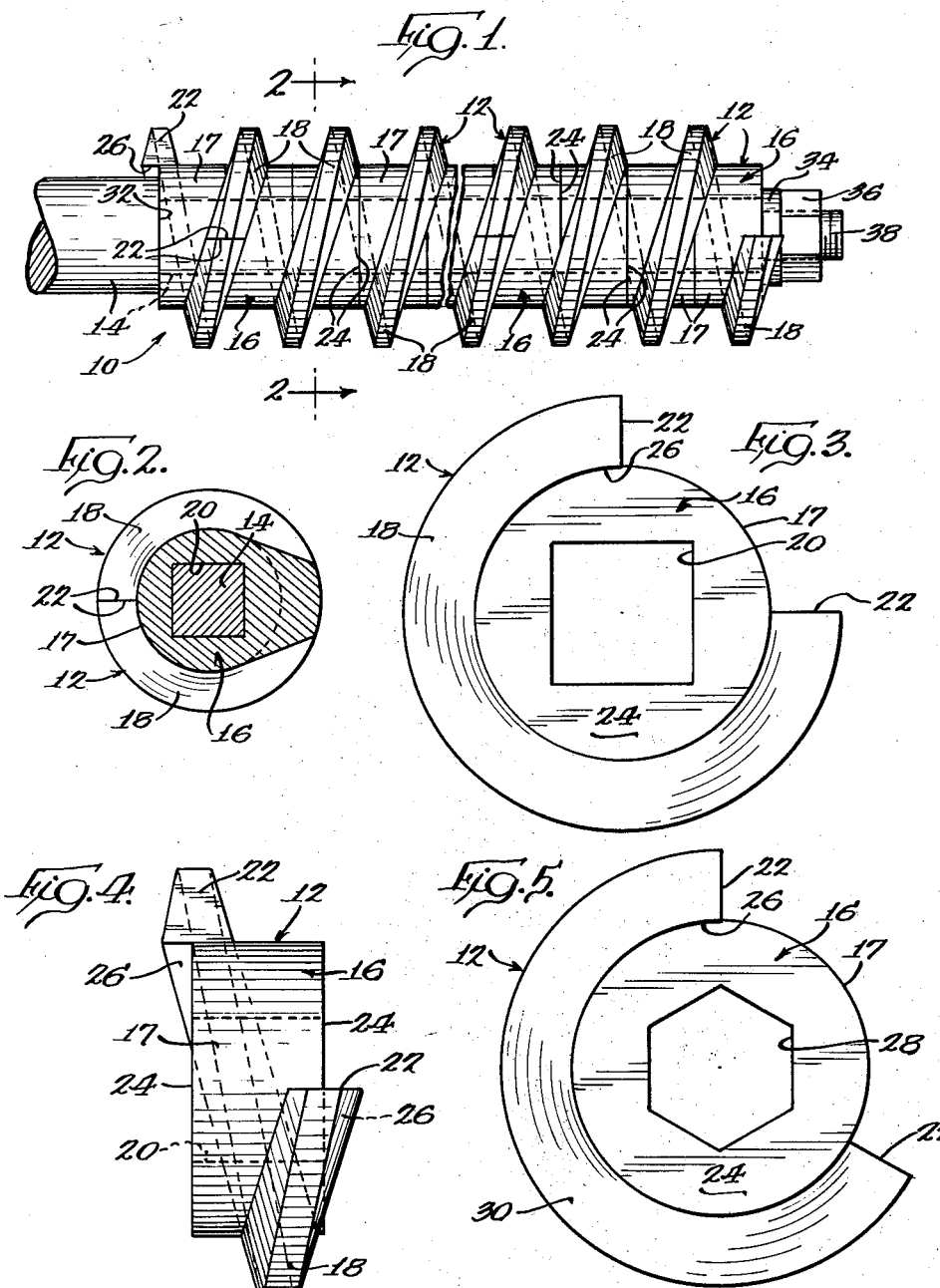

James T. Smith, Wilmette, Ill., assignor to
Jay R. Sheesley, Glencoe, Ill.
Filed July 3, 1961, Ser. No. 121,644
5 Claims. (Cl. 74—458)

The present invention relates to improvements in machine screws or worms, and in particular to a screw or worm comprised of a number of identical elements.

Conventional machining or hobbing methods produce machine worms and screws having manufacturing tolerances within plus or minus a very few ten-thousandths of an inch. Such tolerances are necessary and desirable in many, and indeed in most instances. These results do require care in machining methods and expensive machine tools, and consequently the cost of the finished product is in corresponding relation. On the other hand, there are several types of installations of worms and screws as machine components which do not require such a high degree of manufacturing accuracy as is provided by the usual and conventional methods with relatively high costs. Such installations include stoker feed screws, farm machinery worms, and worms and screws used on railway freight cars, such as hopper cars. Previous to the present invention inexpensive methods of manufacturing worms and screws have not been available to manufacturers and this invention is concerned with their construction and manufacture by a technique which substantially reduces the cost while providing adequate accuracy for the intended use of the worm or screw.

It is, therefore, a principal object of the present invention to provide a new and improved worm having somewhat lower tolerances than customarily obtained through conventional machining methods, but having adequate accuracy in finish for the intended use, which may be manufactured at substantially less cost than a comparable worm manufactured by a conventional machining method.

Another object is to provide a new and improved worm made of a plurality of identical units.

Another object is to provide a new and improved worm of any length by assembling the requisite number of identical units.

Another object is to provide a new and improved worm as described above, where the identical units are steel castings or forgings.

Other objects and advantages will become apparent from the following description taken in conjunction with the accompanying drawing, wherein FIG. 1 is an elevational view of a worm made in accordance with the present invention;

FIG. 2 is a transverse sectional view, taken along the line 2—2 of FIG. 1, looking in the direction of the arrows;

FIG. 3 is an axial elevational or face view of a single unit on a greatly enlarged scale;

FIG. 4 is a longitudinal elevational view of the unit shown in FIG. 3, taken from the right side of FIG. 3; and FIG. 5 is a view similar to FIG. 3, showing a modified form of unit.

In the following description the term "worm" will be used in its most generic sense, and is intended to include feed screws and similar machine elements which do not engage the teeth of a worm wheel or the like, as well as the worms of the usual worm and worm gear combination.

In the drawing, the reference character 10 indicates the worm in its entirety, which is composed of a plurality of units 12 nonrotatably mounted on an axle or shaft 14.

Each unit 12 is identical with every other unit, and preferably is made as a steel casting, although they may be made as forgings.

Each unit comprises a hub 16 having integral therewith a thread 18 of less than a single turn or revolution. The hub 16 has a generally cylindrical surface 17 of a diameter equal to the diameter of the worm 10 and unit 12 less twice the depth of the thread 18. The hub 16 has a noncircular aperture 20 therethrough in shape complementary to the exterior shape of the axle 14. In the first embodiment of the invention illustrated, the axle or shaft 14 has a square cross sectional shape and the hub apertures 20 are similarly square.

Referring particularly to FIGS. 3 and 4, it will be observed that the thread 18 extends three-quarters of the distance circumferentially around the hub 16, and therefore the axial length of the thread is three-quarters, or 75%, of the pitch of a complete worm thread. The ends of the thread have radial faces 22 which when the worm units 12 are assembled on the axle 14 are adapted to abut against similar faces 22 on identical units, as seen in FIGS. 1 and 2. In order properly to position the faces 22 on units, the axial length of the hub 16 can be no different from the axial length of the thread. Thus, with respect to the unit shown in FIGS. 1 through 4, the axial length of the individual threads 18 is equal to three-quarters or 75% of the pitch of the worm in its entirety, and the axial length of the hub 16 is similarly three-quarters or 75% of the pitch.

The unit 12 has its hub 16 provided with opposite faces 24 which are adapted to abut against simliar faces on adjacent units 12 as seen in the assembly of FIG. 1. The thread end faces 22, as will be observed from FIG. 4, are so positioned that the center line of the thread is coincident with the face 24, thus providing an overhanging thread portion 26. This overhang 26 receives a portion of the cylindrical barrel 17 of the juxtaposed hub 16 in assembled position, and together with the abutting faces 22, helps restrain the units 12 against excessive play when they are mounted on the axle or shaft 14, even though the latter not be a particularly snug fit within the apertures 20.

The units 12 preferably are made as steel castings. However, they may be made as forgings and need only be finished sufficiently by tumbling to remove flash and scale. However, should the faces 24 be exceedingly rough or have unwanted projections or fillets on them, a very light machining operation can be used to finish them and obtain proper seating and nesting relationship with identically shaped units 12.

In FIG. 5 there is shown a slightly modified unit 12 which has a hexagonally shaped aperture 28, to receive a hexagonally shaped shaft, and a thread 30 extending about the hub 16 a distance which is two-thirds of the circumference of the hub, and therefore it has an axial length which is two-thirds the pitch of the worm thread. It will be noted from an examination of FIG. 5 that the faces 22 at the ends of the thread 30 are on a radial line which passes through an apex at one of the corners of the hexagonal opening 28. It will be observed from FIG. 3 that the faces 22 are on radial lines which are normal or perpendicular to one of the sides of the square opening 20.

From this can be drawn a conclusion that the opening 20 or 28 in the axis of the hub 16 must be symmetrical with respect to the positions of the two faces 22 at the ends of the thread segments carried by the hub 16. For example, a symmetrical arrangement would be provided if the faces 22 in the embodiment shown in FIG. 3 were in line with diagonals of the square opening. The same would be true of FIG. 5 if the faces 22 were normal to one of the sides of the hexagonal opening 28. The symmetry of the positioning is essential in order that the units 12 may be slid upon the noncircular and complementary shaped shaft or axle 14 so that adjacent thread end faces 22 will abut and thus define a continuous screw thread as seen in FIG. 1.

Another factor which is noted from the disclosure is that the axial length of the thread 18 or 30 must be precisely the same as the axial length of the hub 16 when compared with pitch. In the embodiment shown in FIGS. 3 and 4, for example, the axial length of the thread 18 and the hub 16 is three-quarters the length of pitch. In the embodiment shown in FIG. 5 the axial length of the thread 30 and of the hub 16 is precisely two-thirds the length of pitch. However, the length of the thread and the axial length of the hub may be increased with respect to pitch by unitary multiples. In other words, it is possible to utilize the advantages of this invention in a thread having a length of one and three-quarters or two and three-quarters pitch, and the like, when the hub length is the same. In such cases this thread and hub length will be equal to the pitch times a number other than a whole number. However, it is preferred that the units 12 be made with an axial length less than the length of pitch and preferably not more than three-quarters of the pitch length.

Referring again to FIG. 1, it will be observed that the worm 10 is made by sliding a multiplicity of the units 12 onto the square shank of an axle or shaft 14 and against a shoulder 32 at the left end of the shaft, and when the shaft has been completely filled with the units 12 they are held against axial dislodgment by a washer 34 and a lock nut 36 screwed onto a threaded end 38 of the shaft. Thus, the assembled units define a continuous worm which may be used as a stoker feed screw, as an operating worm in farm machinery where close tolerances are not required, and as an operating worm in controlling the gates on hopper railway cars. Many more uses of this type of worm will readily suggest themselves to those skilled in various arts and various industries, and those given herein are intended merely to be exemplary.

From the foregoing description it will be apparent that the objectives which were claimed for this invention at the outset of this specification are fully attainable by the structures shown and described.

While preferred embodiments of the worm constituting this invention have been shown and described, it will be apparent that numerous further modifications and variations thereof may be made without departing from the underlying principles of the invention. It is therefore desired, by the following claims, to include within the scope of the invention all such variations and modifications by which substantially the results of the invention may be obtained through the use of substantially the same or equivalent means.

What is claimed as new and desired to be secured by United States Letters Patent is:

1. A worm, comprising in combination, a plurality of identical units, each unit consisting of a hub having a diameter equal to the diameter of the worm less twice the depth of the thread and an axial length equal to the pitch of the thread times a multiplying factor of a regular fraction or a whole number plus a regular fraction, each unit having a thread the axial extent of the pitch line of which is equal to the length of said hub, said thread having circumferentially spaced ends with radial faces, said thread faces at opposite ends of said hub having one-half their surfaces overhanging the respective ends of said hub, and a noncircular aperture of regular geometric shape through said hub and oriented with respect to said thread ends in such manner that when a number of said units are arranged with facing thread ends in abutting relation said apertures will be aligned, the geometric shape of said aperture being such that the product of the number of faces of the shape and the multiplying factor is a whole number, an axle having an exterior surface shaped complementary to said hub apertures extending through said apertures, and means restraining said units against axial movement on said axle.

2. A worm, comprising in combination, a plurality of identical units, each unit consisting of a hub having a diameter equal to the diameter of the worm less twice the depth of the thread and an axial length not greater than 75 percent of the pitch of the thread, each unit having a thread the axial extent of the pitch line of which is equal to the same percentage of the pitch as said hub, said thread having circumferentially spaced ends with radial faces, said thread faces at opposite ends of said hub having one-half their surfaces overhanging the respective ends of said hub, and a noncircular aperture of a regular geometric shape through said hub and oriented symmetrically with respect to said thread ends so that when a number of said units are arranged with facing thread ends in abutting relation said apertures will be aligned, the geometric shape of said aperture being such that the product of the number of faces of the aperture shape and the percentage of the pitch of the thread is a whole number, an axle having a exterior surface shaped complementary to said hub apertures extending through said apertures, and shoulder forming means restraining said units against axial movement on said axle.

3. A worm, comprising in combination, a plurality of identical units, each unit consisting of a cylindrical hub having a diameter equal to the diameter of the worm less twice the depth of the thread, an axial length equal to 75 percent of the pitch of the thread and parallel flat end faces parallel to the axis of said unit, each unit having a thread the axial extent of the pitch line of which is equal to 75 percent of the pitch of the thread, said thread having circumferentially spaced ends with radial faces, said thread overhanging said hub end faces adjacent each end thereof, and a square aperture through said hub and oriented symmetrically with respect to said thread ends so that when a number of said units are arranged with hub faces abutting and facing thread ends in abutting relation said apertures will be aligned and said cylindrical hub surfaces will fit under said overhanging thread portions, an axle having a square section extending through said square apertures, and shoulder forming means restraining said units against axial movement on said axle.

4. A worm, comprising in combination, a plurality of identical units, each unit consisting of a hub having a diameter equal to the diameter of the worm less twice the depth of the thread and an axial length equal to 66⅔ percent of the pitch of the thread, each unit having a thread the axial extent of the pitch line of which is equal to the same percentage of the pitch as said hub, said thread having circumferentially spaced ends with radial faces, said thread faces at opposite ends of said hub having one-half their surfaces overhanging the respective ends of said hub, and a noncircular aperture of a regular geometric shape through said hub and oriented symmetrically with respect to said thread ends so that when a number of said units are arranged with facing thread ends in abutting relation said apertures will be aligned, the geometric shape of said aperture being such that the product of the number of faces of the aperture shape and the percentage of the pitch of the thread is a whole number, an axle having an exterior surface shaped complementary to said hub apertures extending through said apertures, and shoulder forming means restraining said units against axial movement on said axle.

5. A worm as claimed in claim 4, wherein the shape of said hub apertures is hexagonal.

References Cited in the file of this patent

UNITED STATES PATENTS

| | | |
|---|---|---|
| 2,475,045 | Osplack | July 5, 1949 |
| 2,759,609 | Hogan et al. | July 31, 1956 |

FOREIGN PATENTS

| | | |
|---|---|---|
| 292,205 | Germany | May 30, 1916 |
| 486,415 | Italy | Nov. 10, 1953 |
| 930,605 | Germany | July 21, 1955 |
| 1,164,076 | France | May 5, 1958 |